United States Patent
Wang et al.

(10) Patent No.: US 10,958,668 B1
(45) Date of Patent: Mar. 23, 2021

(54) FINDING MALICIOUS DOMAINS WITH DNS QUERY PATTERN ANALYSIS

(71) Applicant: Palo Alto Networks, Inc., Santa Clara, CA (US)

(72) Inventors: Jun Wang, Fremont, CA (US); Wei Xu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 83 days.

(21) Appl. No.: 15/850,202

(22) Filed: Dec. 21, 2017

(51) Int. Cl.
*H04L 29/06* (2006.01)
*H04L 29/12* (2006.01)
*G06F 16/27* (2019.01)

(52) U.S. Cl.
CPC .......... *H04L 63/1416* (2013.01); *G06F 16/27* (2019.01); *H04L 61/1511* (2013.01)

(58) Field of Classification Search
CPC .............. G06F 21/564; H04L 63/0227; H04L 63/1416; H04L 63/1425; H04L 63/145; H04L 63/14; H04L 61/1511
See application file for complete search history.

(56) References Cited

U.S. PATENT DOCUMENTS

| | | | |
|---|---|---|---|
| 6,141,686 A | 10/2000 | Jackowski | |
| 8,009,566 B2 | 8/2011 | Zuk | |
| 8,204,984 B1 | 6/2012 | Aziz | |
| 8,856,910 B1 | 10/2014 | Rostami-Hesarsorkh | |
| 9,047,441 B2 | 6/2015 | Xie | |
| 9,177,293 B1 | 11/2015 | Gagnon | |
| 9,253,068 B1 | 2/2016 | Wu | |
| 9,686,291 B2* | 6/2017 | Antonakakis | H04L 63/1408 |
| 9,917,852 B1* | 3/2018 | Xu | H04L 63/1483 |
| 2007/0160200 A1 | 7/2007 | Ishikawa | |
| 2008/0235507 A1 | 9/2008 | Ishikawa | |
| 2010/0095367 A1 | 4/2010 | Narayanaswamy | |
| 2010/0138910 A1 | 6/2010 | Aldor | |
| 2010/0250918 A1 | 9/2010 | Tremblay | |
| 2012/0060142 A1 | 3/2012 | Fliess | |
| 2012/0096261 A1 | 4/2012 | Ko | |
| 2013/0117282 A1* | 5/2013 | Mugali, Jr. | H04L 61/1511 707/748 |
| 2013/0247201 A1 | 9/2013 | Alperovitch | |
| 2013/0263263 A1 | 10/2013 | Narkolayev | |
| 2013/0298192 A1 | 11/2013 | Kumar | |
| 2014/0157414 A1* | 6/2014 | Antonakakis | H04L 63/1483 726/23 |
| 2014/0310394 A1* | 10/2014 | Wood | H04L 43/026 709/224 |

(Continued)

OTHER PUBLICATIONS

Bilge et al., "Exposure: Finding Malicious Domains Using Passive DNS Analysis", NDSS, 2011.

(Continued)

*Primary Examiner* — Olugbenga O Idowu
(74) *Attorney, Agent, or Firm* — Van Pelt, Yi & James LLP

(57) ABSTRACT

Malicious domain finding using DNS query pattern analysis is disclosed. A first DNS query signature and a second DNS query signature are generated, using a set of DNS query records. The first and second DNS query signatures are compared, and the second DNS query signature is identified as malicious based on a detected match between the first and second DNS query signatures.

23 Claims, 10 Drawing Sheets

(56) References Cited

U.S. PATENT DOCUMENTS

2018/0006912 A1     1/2018   Sokolik
2019/0182290 A1     6/2019   Haddad

OTHER PUBLICATIONS

Chatzis et al., "Email Worm Detection by Wavelet Analysis of DNS Query Streams", CICS May 2009.

Bermudez et al., "DNS to the rescue: discerning content and services in a tangled web", In Proceedings of the 2012 Internet Measurement Conference (IMC '12). ACM, New York, NY, USA, 413-426, 2012.

Plonka et al., "Context-aware clustering of DNS query traffic", In Proceedings of the 8th ACM SIGCOMM conference on Internet measurement (IMC '08). ACM, New York, NY, USA, 217-230, 2008.

Wu et al., "Identifying the Use of Data/Voice/Video-Based P2P Traffic by DNS-Query Behavior," 2009 IEEE International Conference on Communications, Dresden, pp. 1-5, 2009.

Zdrnja et al., "Passive Monitoring of DNS Anomalies", In: M. Hämmerli B., Sommer R. (eds) Detection of Intrusions and Malware, and Vulnerability Assessment. DIMVA 2007. Lecture Notes in Computer Science, vol. 4579. 2007.

Trevisan et al., Towards Web Service Classification using Addresses and DNS, 2016, IEEE.

\* cited by examiner

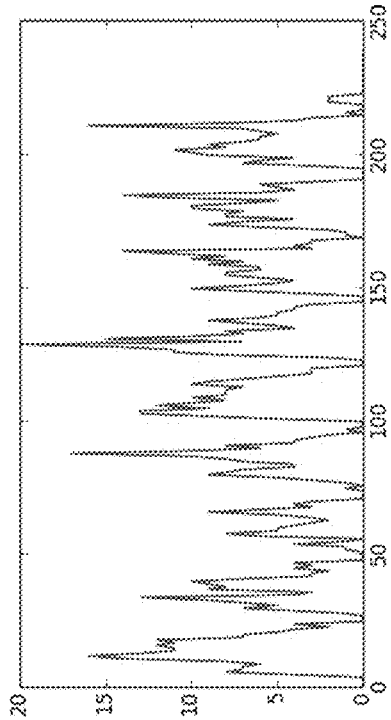
FIG. 3B
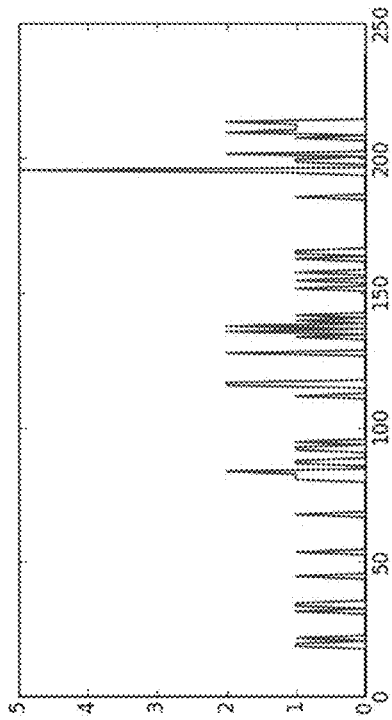
FIG. 3C
```
kjh2398sdfj.com    2017-01-01    12:30:49
kjh2398sdfj.com    2017-01-01    12:30:50
kjh2398sdfj.com    2017-01-01    12:30:51
kjh2398sdfj.com    2017-01-01    12:30:53
kjh2398sdfj.com    2017-01-01    12:31:49
kjh2398sdfj.com    2017-01-01    12:30:49
kjh2398sdfj.com    2017-01-01    19:30:49
kjh2398sdfj.com    2017-01-01    19:30:50
kjh2398sdfj.com    2017-01-01    19:30:50
kjh2398sdfj.com    2017-01-01    19:30:50
                        ⋮
kjh2398sdfj.com    2017-01-03    12:30:46
kjh2398sdfj.com    2017-01-03    12:30:47
kjh2398sdfj.com    2017-01-03    12:30:48
kjh2398sdfj.com    2017-01-03    12:30:50
kjh2398sdfj.com    2017-01-03    12:31:46
kjh2398sdfj.com    2017-01-03    19:30:46
kjh2398sdfj.com    2017-01-03    19:30:47
kjh2398sdfj.com    2017-01-03    19:30:47
kjh2398sdfj.com    2017-01-03    19:30:47
```
⎫302
FIG. 3A

```
{
    "signature_id": 1123,        ~502
    "time_window": {              ~504
        "start": "2017-08-01 00:00:00",
        "end": "2017-08-10 23:59:59"
    },                            ~506
    "bin_size": 3600,
    "pattern":                    ~508
"(0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,0,16,24,0,48,32,24,32,48,40,24,40,24,16,32,0,16,24,8,40,24,24,40,32,16,8,40,24,32,16,24,0,48,24,16,24,32,24,40,24,0,24,16,24,40,24,24,16,24,40,40,24,48,40,40,16,40,16,48,32,48,48,8,16,24,16,40,40,32,16,40,32,32,56,48,24,24,40,32,16,8,24,8,32,40,24,24,24,48,40,16,40,16,24,16,8,64,16,40,32,24,32,32,16,24,32,16,24,40,24,40,24,40,24,32,16,8,24,32,16,48,32,40,32,0,32,24,0,24,40,24,24,48,16,24,24,16,40,24,40,0,40,16,16,48,32,40,16,24,48,24,8,0,0,0,0
,0,0,0,0,0,0)",                   ~510
    "malware_domain": "kukutrustnet777.info",
    "malware_family": "Sality",   ~512
    "malware_behaviors": ["ModifyWindowsFirewall", "ProcessInjection"]  ~514
}
```

FIG. 5

FINDING MALICIOUS DOMAINS WITH DNS QUERY PATTERN ANALYSIS

BACKGROUND OF THE INVENTION

Nefarious individuals attempt to compromise computer systems in a variety of ways. As one example, such individuals may embed or otherwise include malicious software ("malware") in email attachments and transmit (or cause the malware to be transmitted) to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIG. 3A is a representation of a set of passive DNS information for a domain.

FIG. 3B is a graph of DNS requests for a domain in a given time period.

FIG. 3C is a graph of DNS requests for a domain in a given time period.

FIG. 5 illustrates an example of a DNS signature.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
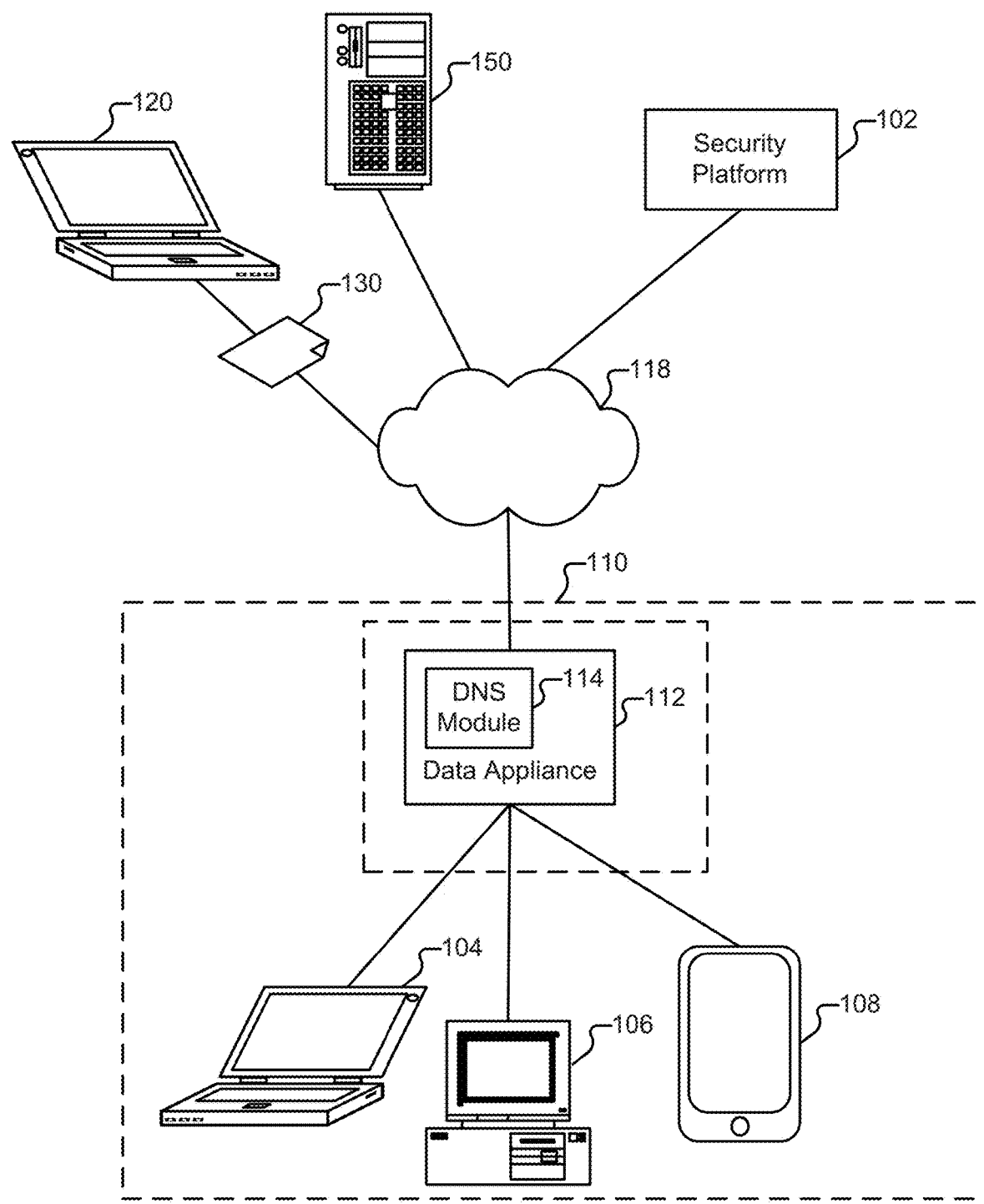
FIG. 1A illustrates an example of an environment in which malicious domains are detected and their harm reduced.

FIG. 1A illustrates an example of an environment in which malicious domains are detected and their harm reduced. Examples of malicious domains include command and control (C&C) servers, servers that facilitate data exfiltration, phishing sites, and sites hosting malicious executables (e.g., ransomware or spyware). Using techniques described herein, DNS record query information is used to generate signatures (also referred to herein interchangeably as "DNS signatures" and "signals") of malicious domains. The terms "domains" and "resource records" are used herein interchangeably.

DNS signatures can be used in a variety of beneficial ways. As one example, DNS signatures can be provided to firewalls, intrusion detection systems, intrusion prevention systems, or other appropriate appliances. If a client device protected by such an appliance performs DNS queries that match a DNS signature, such behavior can be treated as suspicious/malicious by the appliance, and remedial actions can be taken. As another example, a DNS signature of a known malicious domain can be used (e.g., by a security platform) to identify other domains not previously known to be malicious (but have DNS signatures that match the known malicious domain's signature within a threshold amount).

In the example environment shown in FIG. 1A, client devices 104-108 are a laptop computer, a desktop computer, and a tablet (respectively) present in an enterprise network 110. Data appliance 112 is configured to enforce policies regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 112 is also configured to enforce policies with respect to traffic that stays within enterprise network 110.

Appliance 112 can take a variety of forms. For example, appliance 112 can comprise a dedicated device or set of devices. The functionality provided by appliance 112 can also be integrated into or executed as software on a general purpose computer, a computer server, a gateway, and/or a network/routing device. In some embodiments, services provided by data appliance 112 are instead (or in addition) provided to client 104 by software executing on client 104.

Whenever appliance 112 is described as performing a task, a single component, a subset of components, or all components of appliance 112 may cooperate to perform the task. Similarly, whenever a component of appliance 112 is described as performing a task, a subcomponent may perform the task and/or the component may perform the task in conjunction with other components. In various embodiments, portions of appliance 112 are provided by one or more third parties. Depending on factors such as the amount of computing resources available to appliance 112, various logical components and/or features of appliance 112 may be omitted and the techniques described herein adapted accordingly. Similarly, additional logical components/features can be included in embodiments of appliance 112 as applicable.

In the example shown in FIG. 1A, a malicious individual (using system 120) has created malware 130. The malicious individual hopes that a client device, such as client device 104, will execute a copy of malware 130, compromising the client device and, for example, causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose C&C server 150 is reachable by the domain "kjh2398sdfj.com," which the malware author registered using a stolen identity/credit card information. While malware 130 could explicitly include the domain "kjh2398sdfj.com" in its code, techniques such as static/dynamic analysis of malware 130 could make it possible for a security company (or other applicable entity, such as a security researcher) to identify the domain "kjh2398sdfj.com" as a C&C server, and take remedial actions (e.g., publish the domain "kjh2398sdfj.com" on a blacklist, and/or act to get the C&C server shut down/made unreachable). Further, if the domain "kjh2398sdfj.com" is hard coded into malware 130, once C&C server 150 is shut down, the malware author will potentially be unable to switch the command and control server used by malware 130 (e.g., switch the malware from contacting "kjh2398sdfj.com" to another, still reachable domain)—making the malware less useful to the malware author.

Instead of hard coding the domain "kjh2398sdfj.com" into malware 130, another approach is for the malware author to make use of algorithmically generated domains ("AGDs"). With AGDs, instead of trying to contact a specific, predetermined domain, malware 130 can programmatically generate multiple domain names and try to connect to each generated name in turn, until a successful connection is made. Further, the malware can continue to generate domain names, so that in the event "kjh2398sdfj.com" becomes no longer reachable, the malware can successfully contact the C&C server at a new domain (e.g., at "jdy328u.com"). In an example scenario, suppose that malware 130 is propagated to and compromises 1,000 computers across the Internet. One behavior of malware 130 is that every morning at 5:02 am, infected nodes attempt to contact C&C server 150. If successful, the infected nodes receive instructions from C&C server 150. Another behavior of malware 130 is that, periodically throughout the day, infected nodes attempt to contact C&C server 150 and provide status updates. Malware 130 causes these behaviors so that infected nodes can all be instructed to engage in the same task, at the same time (e.g., 5:02 am), but not overwhelm C&C server 150 with task results (e.g., by causing only 10% of nodes to report status in a given time frame). Thus, every morning at 5:02 am, 1,000 connections are made to C&C server 150. And, throughout the day, at any given hour, some subset of the 1,000 nodes make connections to C&C server 150. In the event "kjh2398sdfj.com" is no longer available, each of the 1,000 nodes will begin contacting the new domain, "jdy328u.com," using the same communication schedule they used with "kjh2398sdfj.com."

In various embodiments, appliance 112 is configured to work in cooperation with a security platform (e.g., platform 102). As one example, platform 102 can provide to appliance 112 a set of signatures of known-malicious files (e.g., as part of a subscription). If a signature for malware 130 is included in the set, appliance 112 can prevent the transmission of malware 130 to client 104 accordingly. As another example, platform 102 can provide to appliance 112 a list of known malicious domains (e.g., including "kjh2398sdfj.com"), allowing appliance 112 to block traffic between network 110 and server 150. The list of malicious domains can also help appliance 112 determine when one of its nodes has been compromised. For example, if client 104 attempts to contact C&C server 150, such attempt is a strong indicator that client 104 has been compromised by malware (and remedial actions should be taken accordingly, such as quarantining client 104 from communicating with other nodes within network 110). Unfortunately, when C&C server 150 moves from using the domain "kjh2398sdfj.com" to the domain "jdy328u.com," the domain "jdy328u.com" will likely not be present on appliance 112's blacklist, and appliance 112 may thus not be able to prevent client 104 from communicating with C&C server 150.

In various embodiments, data appliance 112 includes a DNS module 114, which is configured to receive (e.g., from security platform 102) a set of DNS query signatures. DNS module 114 can also be configured to send (e.g., to platform 102) DNS query data (e.g., logs of DNS requests made by clients such as clients 104-108). DNS module 114 can be integrated into appliance 112 (as shown in FIG. 1A) and can also operate as a standalone appliance in various embodiments. And, as with other components shown in FIGS. 1A-2, DNS module 114 can be provided by the same entity that provides appliance 112 (and/or security platform 102), and can also be provided by a third party (e.g., one that is different from the provider of appliance 112 or security platform 102). Further, as with other elements of appliance 112, in various embodiments, the functionality provided by DNS module 114 (or portions thereof) is instead/in addition provided by software executing on a client (e.g., client 104).

Figure 1B:
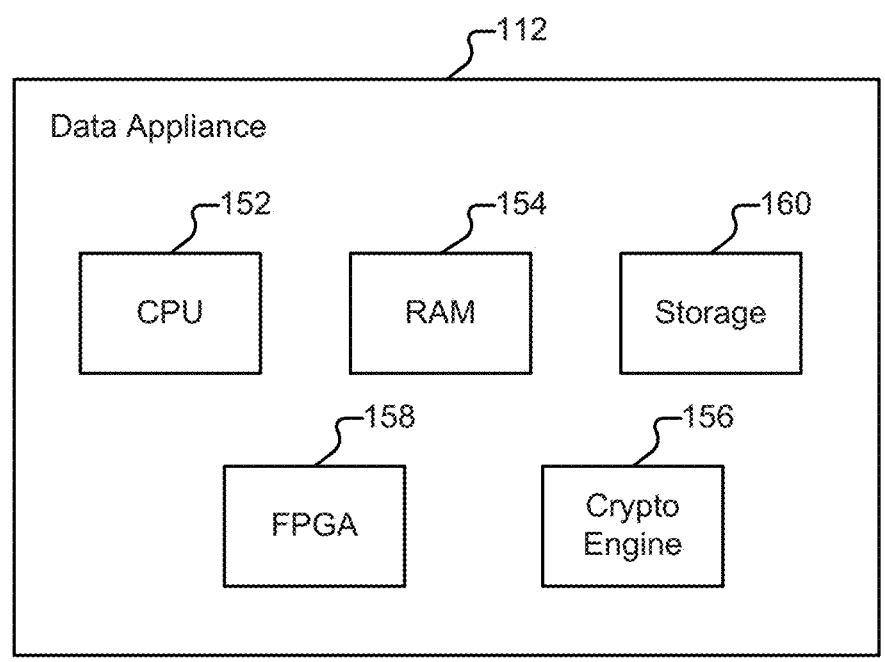
FIG. 1B illustrates an embodiment of a data appliance.

FIG. 1B illustrates an embodiment of a data appliance. The example shown is a representation of physical components that are included in appliance 112, in various embodiments. Specifically, appliance 112 includes a high performance multi-core CPU 152 and RAM 154. Appliance 112 also includes a storage 160 (such as one or more hard disks), which is used to store policy and other configuration information, as well as URL information. Data appliance 112 can also include one or more optional hardware accelerators. For example, data appliance 112 can include a cryptographic engine 156 configured to perform encryption and decryption operations, and one or more FPGAs 158 configured to perform matching, act as network processors, and/or perform other tasks.

Figure 2:
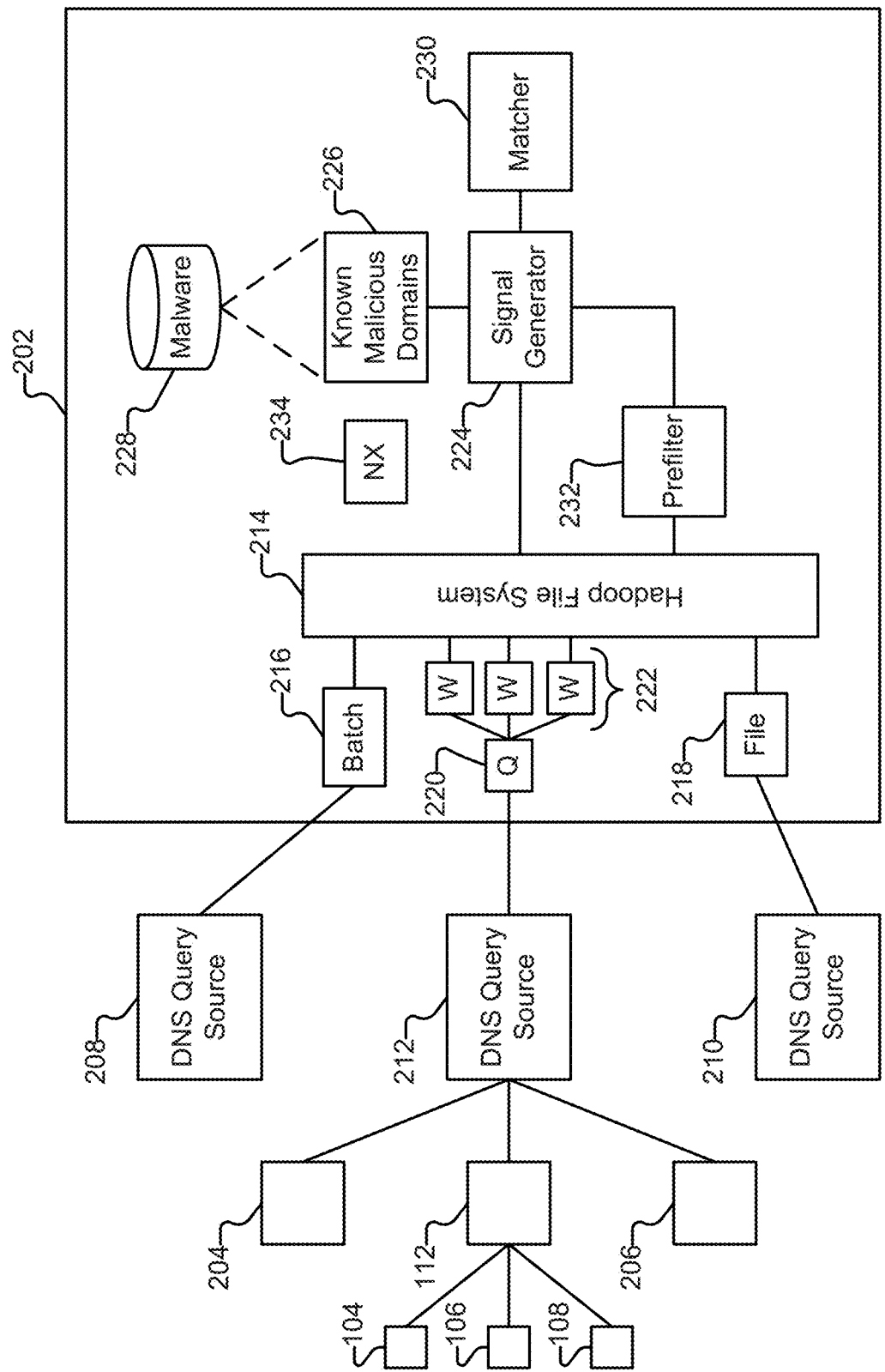
FIG. 2 illustrates an embodiment of a security platform.

FIG. 2 illustrates an embodiment of a security platform. Security platform 202 is an embodiment of security platform 102. Security platform 202 can be implemented in a variety of ways. As shown, security platform 202 makes use of commercially available public cloud resources, such as Amazon Web Services and/or Google Cloud Platform resources. Other platform resources provided by other vendors can also be used, as applicable (e.g., as offered by Microsoft), as can (in various embodiments) commodity server-class hardware.

Security platform 202 receives DNS query information (e.g., passive DNS data) from a variety of sources (208-212), using a variety of techniques. Sources 208-212 collectively provide platform 202 with approximately five billion unique records each day. An example of a record is:
    abc.com 199.181.132.250 2017-01-01 12:30:49
The record indicates that, on Jan. 1, 2017, a DNS query was made for the site "abc.com" and at that time, the response provided was the IP address "199.181.132.250." In some cases, additional information can also be included in a record. For example, an IP address associated with the requestor may be included in the record, or may be omitted (e.g., due to privacy reasons).

Source 208 is a real-time feed of globally collected passive DNS. An example of such a source is Farsight Security Passive DNS. In particular, records from source 208 are provided to platform 202 via an nmsgtool client, which is a utility wrapper for the libnmsg API that allows messages to be read/written across a network. Every 30 minutes, a batch process 216 (e.g., implemented using python) loads records newly received from source 208 into an Apache Hadoop cluster (HDFS) 214.

Source 210 is a daily feed of passive DNS associated with malware. An example of such a source is the Georgia Tech Information Security Center's Malware Passive DNS Data Daily Feed. Records from source 210 are provided to platform 202 as a single file via scp and then copied into HDFS 214 (e.g., using copyFromLocal on the file location 218 (e.g., a particular node in a cluster configured to receive data from source 210)).

As previously mentioned, appliance 112 collects DNS queries made by clients 104-108 and provides passive DNS data to platform 102. In some embodiments, appliances such as appliance 112 directly provide the passive DNS information to platform 102. In other embodiments, appliance 112 (along with many other appliances) provides the passive DNS information to an intermediary, which in turn provides the information to platform 102. In the example shown in FIG. 2, appliance 112, along with other appliances, such as appliances 204 and 206 (and thousands of other appliances, not pictured), provide their collected DNS information to a server, which in turn provides the collected information (as source 212) to platform 202. In particular, source 212 provides the collected DNS information to a queue service 220 which in turn uses a set of workers 222 to copy records into HDFS 214. Other technologies can also be used to copy records into HDFS 214, such as Apache Kafka. In various embodiments, the DNS information provided to platform 202 arrives filtered (e.g., by data appliances such as data appliance 112, by server/source 212, or both). One example of such filtering includes filtering out DNS information associated with DNS requests for known benign domains, and/or popular websites. Domain whitelists (e.g., provided to appliance 112 by platform 102) and the Alexa top 1,000 (or other) sites are examples of filters that can be used. Another example of a filter includes one specified by an administrator of appliance 112 (e.g., to prevent local DNS query information from leaving network 110).

FIG. 3A is a representation of a portion of passive DNS information for the domain, "kjh2398sdfj.com" stored in HDFS 214. A given line in FIG. 3A indicates a unique request for the IP address of kjh2398sdfj.com. Each request for kjh2398sdfj.com's IP address can be considered an event, which has a corresponding timestamp (e.g., timestamp 302). The number of events, for a given domain, in a given time period (e.g., one hour) can be counted and used as a signature for the domain. Graphs of DNS requests for two domains are shown in FIGS. 3B and 3C, respectively. The graph shown in FIG. 3B corresponds to the malicious domain, "kukutrustnet777.info." The graph shown in FIG. 3C corresponds to the malicious domain, "it.qssneek.net." The y-axis of each graph indicates the number of DNS queries made, and the x-axis of each graph indicates time, in one hour increments. Thus, each graph indicates the number of queries made (in one hour intervals) for the respective domain in a ten day period (with each graph depicting a total of 240 data points).

Platform 202 includes a list of known malicious domains 226 (stored, e.g., in a repository 228). The list can be generated by platform 202 (e.g., based on malware static/dynamic analysis modules not pictured) and can also be provided to platform 202 (e.g., by an external service), or augmented by information provided by one or more external services (e.g., VirusTotal). In various embodiments, platform 202 is configured to generate a DNS signature for each domain included in the list of known malicious domains. While referred to herein as list 226, other data structures can also be used to make known malicious domain names (and as applicable, information associated with such domains) available for use by platform 202.

Figure 4:
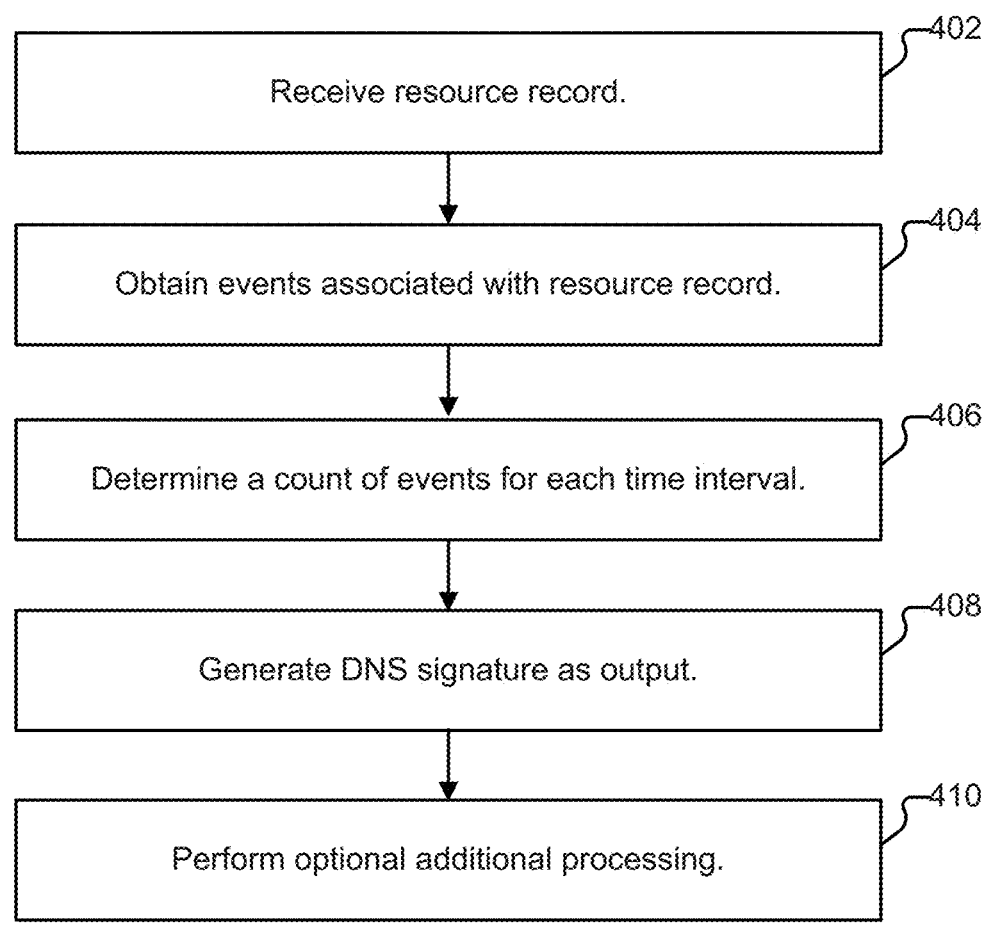
FIG. 4 illustrates an embodiment of a process for generating a DNS signature.

FIG. 4 illustrates an embodiment of a process for generating a DNS signature. In various embodiments, process 400 is performed by platform 202, and in particular by signal generator 224. One example way to implement signal generator 224 is using a script (or set of scripts) authored in an appropriate scripting language (e.g., python), using MapReduce (as applicable). Process 400 begins at 402 when a resource record is received. As one example, a resource record is received when signal generator 224 obtains a domain from list 226 (e.g., obtains "kjh2398sdfj.com" from list 226). At 404, signal generator 224 obtains (e.g., from HDFS 214) events associated with the domain within a given time window. As an example, at 404, signal generator 224 obtains information including what is depicted in FIG. 3A, corresponding to the last seven days. At 406, a count of the events occurring in each time interval over the time window is determined. An example time interval is one hour. At 408, a DNS signature is generated using the counts determined at 406. The generated signature can be stored in HDFS 214 or another appropriate location, as applicable. An example of a DNS signature, generated in accordance with an embodiment of process 400, is depicted in FIG. 5.

Signature 500, represented in JSON, corresponds to a signature for the known malicious domain, kukutrustnet777.info (510). The signature has a unique identifier (502) and was generated using ten days' worth of passive DNS information (as indicated in region 504). When process 400 is later repeated for kukutrustnet777.info (e.g., a day later, a week later, or a month later), a new signature can be generated.

As indicated in region 506, an interval of one hour (60×60 seconds) was used for bucketing DNS request data. Region 508 provides the counts, for each interval in a time series, of DNS requests occurring during that interval. In various embodiments, in addition to having a list of known malicious domains (226), platform 202 also includes additional information about such domains. As one example, list 226 can further include (where available/if applicable) information such as which malware family makes use of the domain (512), and behaviors the associated malware family engages in (514). In various embodiments, additional information such as MD5 hashes of malware samples associated with the domain, is also included in signatures. Such additional information can be included in list 226 and can also be obtained from another source (e.g., a malware database stored on platform 102 or otherwise available to platform 102). Further, as previously mentioned, platform 102 can provide DNS signatures to data appliances such as data appliance 112. Data appliance 112 (e.g., via DNS module 114) can monitor DNS requests (e.g., made by client 104) for matches of such signatures, potentially detecting as suspicious/malicious attempts made by client 104 to communicate with "jdy328u.com" before the domain is otherwise identified as malicious. In various embodiments, and where applicable, platform 102 can provide an alert (or otherwise inform), e.g., to an entity from which the DNS query information was collected. As one example, suppose DNS query information provided by appliance 112 to platform 102 includes an event in which client device 104 communicates with "jdy328u.com" (which has not yet been determined to be malicious). When platform 102 determines that "jdy328u.com" is malicious (e.g., using process 700), platform 102 can alert appliance 112 that a node in network 110 has been compromised (and an administrator of network 110 can further investigate to determine that the node was client 104).

Figure 6A:
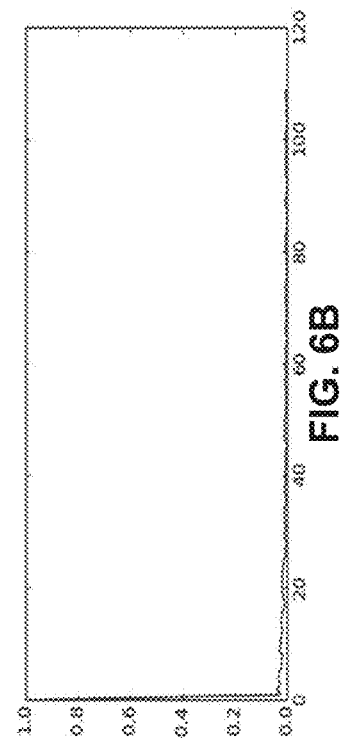
FIG. 6A depicts a graph of DNS requests for a domain in a given time period.
Figure 6B:
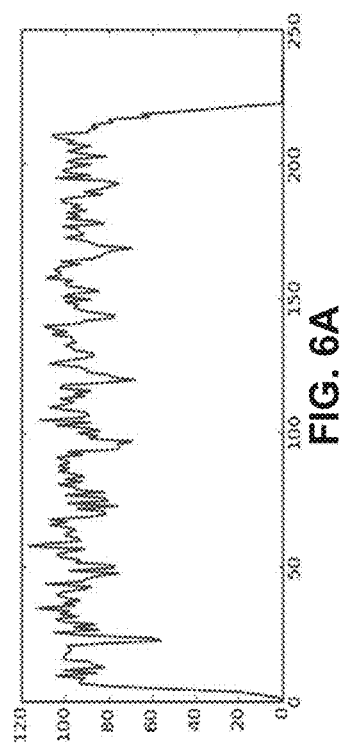
FIG. 6B illustrates a fast Fourier transform of the signal depicted in FIG. 6A.
Figure 6C:
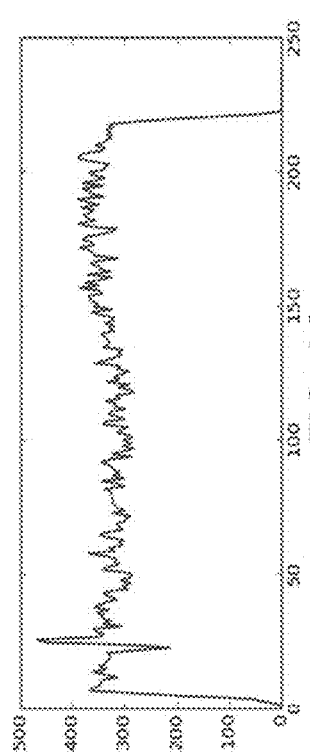
FIG. 6C depicts a graph of DNS requests for a benign domain in a given time period.

Some DNS signatures are better for identifying malicious domains than others. FIG. 6A depicts a graph of DNS requests for the known malicious domain, "wifi04.y5en.com," over a ten day period. FIG. 6C depicts a graph of DNS requests for a benign domain, "xmsecu.com." If a comparison (described in more detail below) is performed between the signatures of "wifi04.y5en.com" and "xmsecu.com," the signatures will be determined to match. The false positive match in this case is due to the signature for "wifi04.y5en.com" being noisy, instead of corresponding to a valid signal.

Returning to FIG. 4, in various embodiments, additional processing (410) is performed on generated signatures, e.g., for quality. One example of such additional processing is to perform a fast Fourier transform (FFT) on the signature data, and evaluate the FFT for peaks in the frequency domain. One way to perform such processing is by using a script written in python (or another appropriate scripting language) that makes use of a standard signal processing library (e.g., scipy.signal). FIG. 6B illustrates an FFT of the signal depicted in FIG. 6A. The result is flat, with no peaks present, indicating the signal is noisy. Accordingly, in various embodiments, a DNS signature for "wifi04.y5en.com" (e.g., generated by signal generator 224) would not be saved to HDFS 214 and thus the DNS signature for "wifi04.y5en.com" would not be used in further processing (e.g., matching described in more detail below).

Figure 6D:
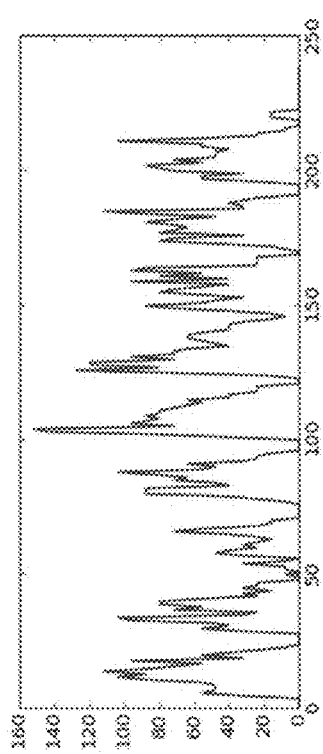
FIG. 6D depicts a graph of DNS requests for a domain in a given time period.
Figure 6E:
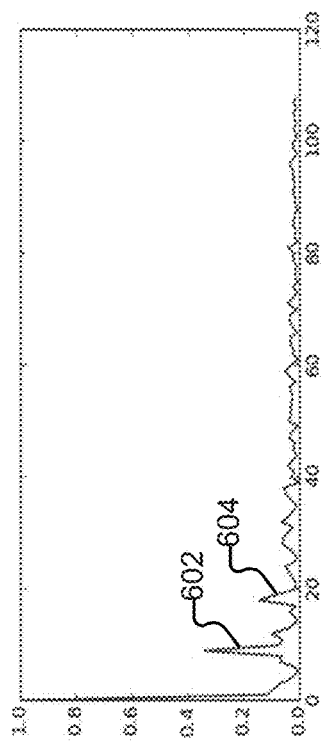
FIG. 6E illustrates a fast Fourier transform of the signal depicted in FIG. 6D.

FIG. 6D depicts a graph of DNS requests for the known malicious domain, "kukutrustnet777.info." An FFT of the signal depicted in FIG. 6D is shown in FIG. 6E. In contrast to the FFT shown in FIG. 6B, the FFT in FIG. 6E includes peaks (e.g., 602 and 604) in the frequency domain. Accordingly, the signature for "kukutrustnet777.info" is included in HDFS 214 (e.g., at the conclusion of process 400).

Matching

Figure 7:
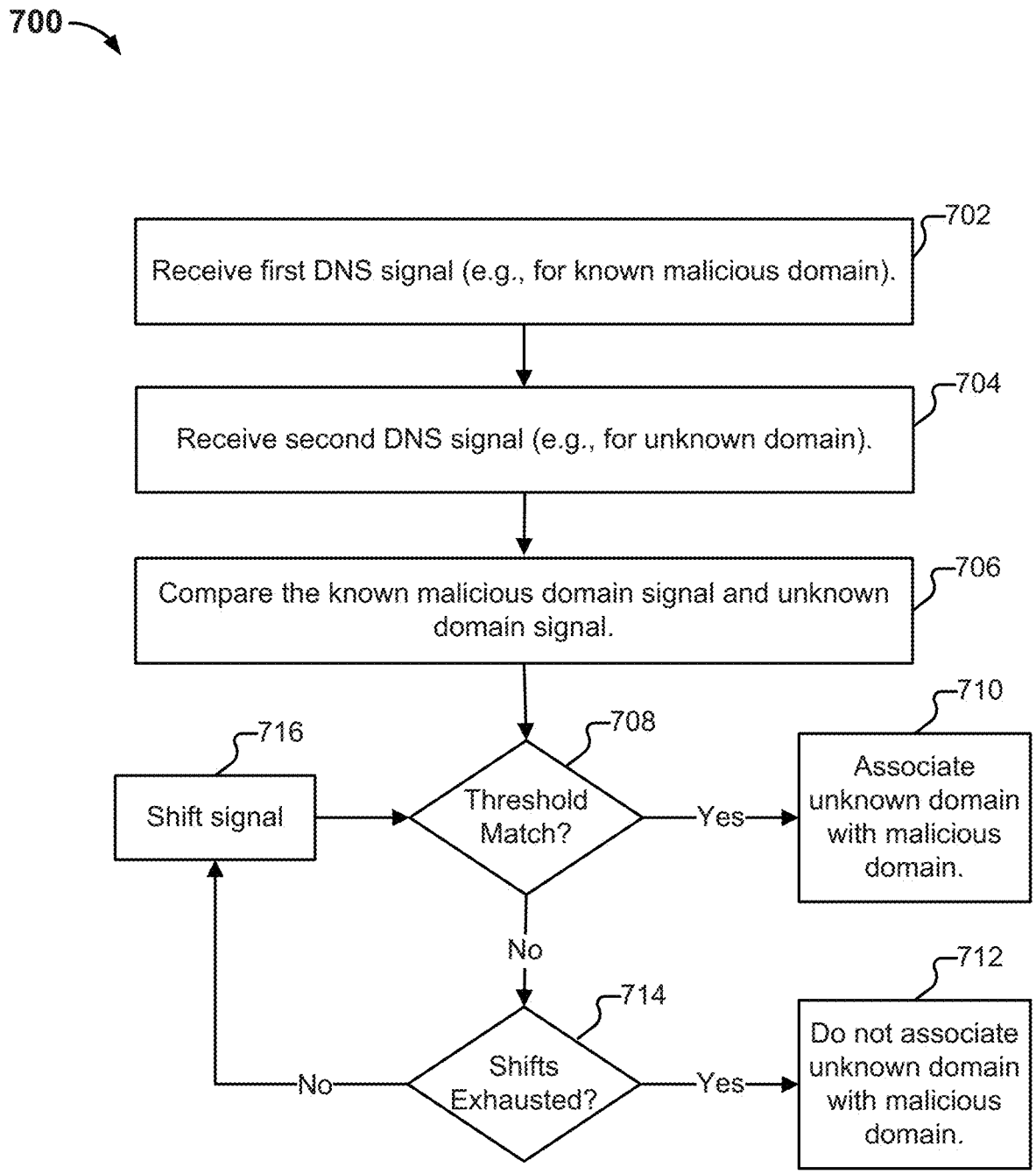
FIG. 7 illustrates an embodiment of a process for determining whether two domains share similar DNS query patterns.

FIG. 7 illustrates an embodiment of a process for determining whether two domains share a DNS query pattern. In particular, process 700 can be used to identify whether a target domain exhibits similar DNS query patterns to a known malicious domain, and thus helps identify the target domain as being malicious. In various embodiments, process 700 is performed by platform 202, and in particular by matcher 230. One example way to implement matcher 230 is using a script (or set of scripts) authored in an appropriate scripting language (e.g., python), using MapReduce (as applicable).

Process 700 begins at 702 when a first DNS signal is received. As one example, such a signal is received at 702 when matcher 230 obtains a signature of a known malicious domain (e.g., signature 500). The signal can be received in a variety of ways, as applicable, including by extracting it from HDFS 214 (or another applicable storage, such as a file system on a single node present in platform 102), and receiving it as output directly from signal generator 224.

As previously explained, HDFS 214 stores passive DNS information collected from a variety of sources (208-212). Some sources, such as source 212, may prefilter the passive DNS information, so that requests for high-demand domains (e.g., wikipedia.org) and other domains, as applicable, do not consume resources on platform 102 (and/or do not unnecessarily consume other resources, such as the bandwidth of appliance 112). Other sources, such as source 208, may provide all observed passive DNS information to platform 202. In various embodiments, platform 202 includes a prefilter 232, which filters out domains from further processing, such as commonly accessed domains, known good domains, customer domains, etc., thereby excluding their processing by matcher 230. One example way to implement prefilter 232 is using a script (or set of scripts) authored in an appropriate scripting language (e.g., python), using MapReduce (as applicable). Another example of domains that can be filtered out by prefilter 232 are NX domains (234) which can be provided to prefilter 232 in a list, database, or other appropriate manner. After prefiltering, the remaining domains include known malicious domains and target domains, which could potentially be associated with known malicious domains. Target domains are also referred to herein as unknown domains. Signatures are determined for target domains (e.g., using process 400). As with the malicious domain DNS signatures, the generated DNS signatures for targets can be stored in HDFS 214 or another appropriate location, as applicable.

At 704, a second (target) DNS signal is received. As with the portion 702 of process 700, matcher 230 can extract the target signal from HDFS 214 (or another applicable storage, such as a file system on a single node), receive it as output directly from signal generator 224, etc.

At 706, the two signals, received at 702 and 704, respectively, are compared. One way to compare the two signals is by determining a Pearson product-moment correlation coefficient (e.g., using scipy.stats) and applying a threshold (708). A coefficient of 1 indicates that the two signals are identical. A coefficient of −1 indicates that the signals are opposite one another. A coefficient of 0 indicates that the signals are not correlated. If the coefficient is higher than the threshold value (e.g., 0.9), a conclusion can be made that the target domain is associated with the known malicious domain 710. A variety of actions can be taken at 710 in conjunction with the determination. As one example, information about the known malicious domain (e.g., whether it belongs to a malware family, what types of malicious behavior it engages in, etc.) can be assigned to the target domain. Thus, if a target is determined to match signature 500, an entry for the target domain can be added to repository 228, linking it to domain 510, and also linking it with the Sality family (512), and behaviors 514. An identification of the target domain belonging to the Sality family (and/or other applicable information) can also be automatically provided to third party security services, can be propagated to data appliances such as data appliances 112, 204, and 206, etc.

Figure 8:
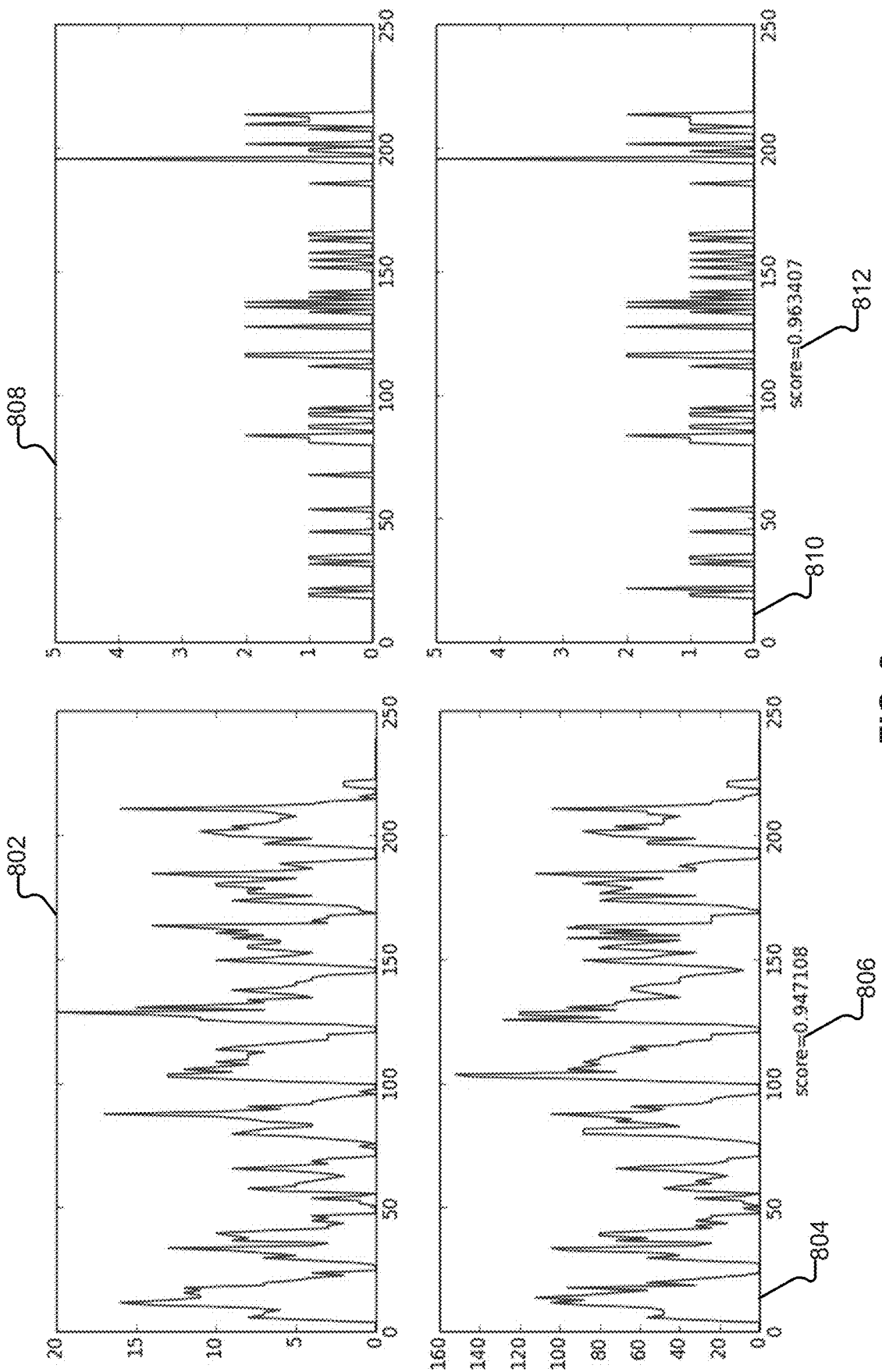
FIG. 8 illustrates examples of DNS query patterns for two malicious domains, and for two target domains determined to have matching DNS query patterns.

FIG. 8 illustrates examples of DNS query patterns for two malicious domains, and for two target domains determined to have matching DNS query patterns. Region 802 depicts a graph of DNS requests for the known malicious domain, "kukutrustnet777.info." Region 804 depicts a graph of DNS requests for the target domain, "kjwre77638dfqwieuoi.info." Pairwise comparisons of the signal for "kukutrustnet777.info" with the signals of target domains (e.g., by matcher 230) resulted in a determination that the target domain "kjwre77638dfqwieuoi.info" (previously unknown to be malicious) matches the domain, "kukutrustnet777.info." In particular, matcher 230 determined a Pearson product-moment correlation coefficient of 0.947108 (806) for the two signals.

Region 808 depicts a graph of DNS requests for the known malicious domain, "it.qssneek.net." Region 810 depicts a graph of DNS requests for the target domain, "ae.qssneek.net." Pairwise comparisons of the signal for "it.qssneek.net" with the signals of target domains (e.g., by matcher 230) resulted in a determination that the target domain "ae.qssneek.net" (previously unknown to be malicious) matches the domain, "it.qssneek.net." In particular, matcher 230 determined a Pearson product-moment correlation coefficient of 0.963407 (812) for the two signals.

Figure 9:
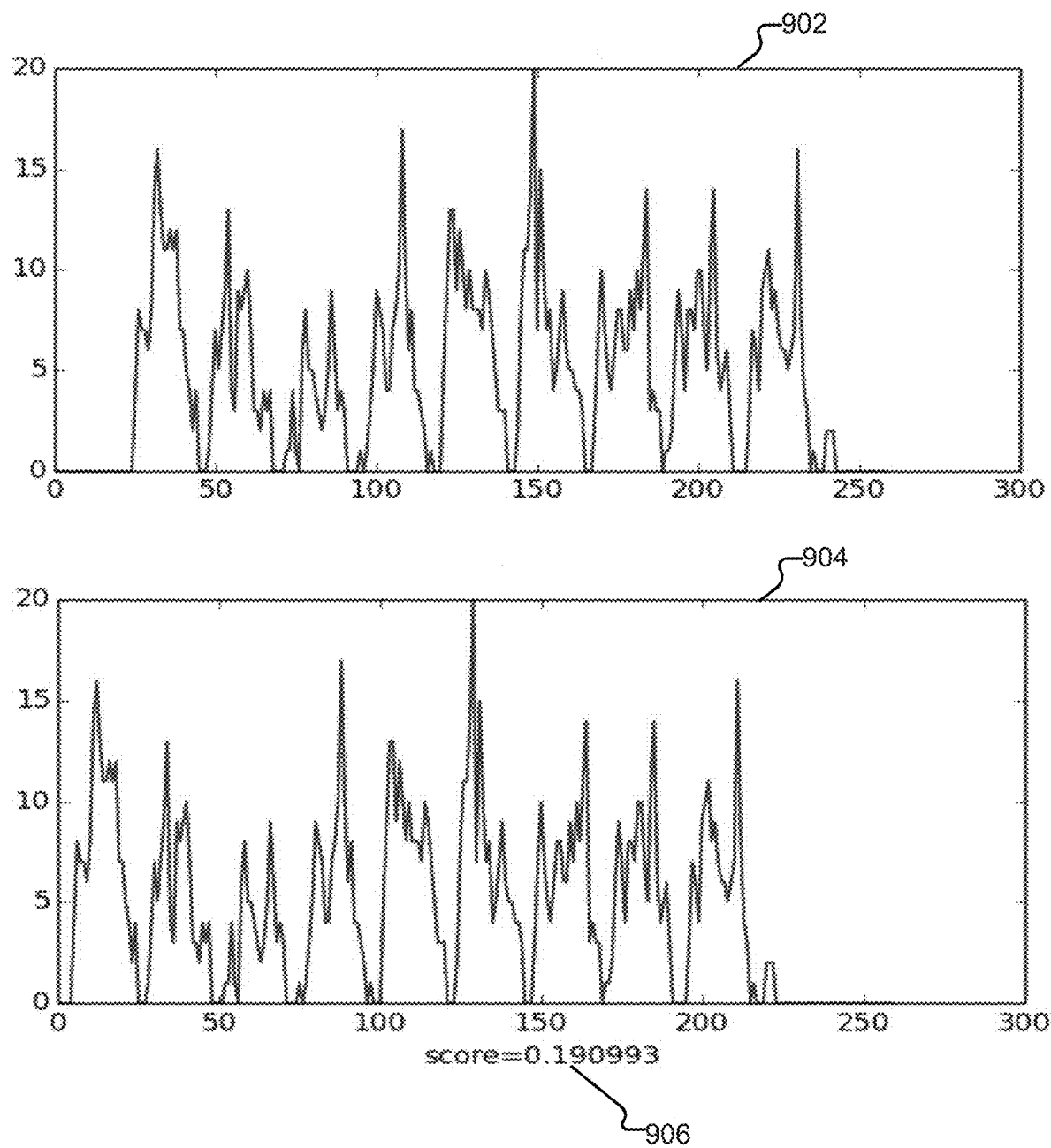
FIG. 9 illustrates an example of a DNS query pattern for a malicious domain that is shifted in time from a DNS query pattern for a target domain.

In many cases, pairwise comparisons of the signals of known malicious domains will not result (at 708) in a successful threshold match. Typically, the lack of match will be due to the two signals in fact being different. For example, the Pearson product-moment correlation coefficient, if taken using signal 804 and signal 808 would be very low. Another reason the Pearson product-moment correlation coefficient can be below the threshold match value is if the signal of the target domain is shifted in the time domain from the signal of the known malicious domain. An example of this scenario is shown in FIG. 9. Region 902 depicts a graph of DNS requests for a known malicious domain. Region 904 depicts a graph of DNS requests for a target domain. The two graphs appear virtually identical (other than the time shift), yet the Pearson product-moment correlation coefficient is 0.190993 (906). One reason for an observed time shift is inaccuracy in the passive DNS collection process. Another reason for an observed time shift is that the malware is configured to try different domains at offset times (e.g., trying domain1 at a first time, trying domain2 three hours later, trying domain3 six hours later, etc.). Yet another reason for an observed time shift is due to different compromised nodes having different time zones.

Returning to FIG. 7, in various embodiments, in the event a threshold match is not found at 708, the values comprising the signal of the target (e.g., values such as are shown in region 508) are shifted left by one time interval (716) and another Pearson product-moment correlation coefficient is taken (708). Shifts left and right are performed, until either a match is found (710), or all possible shifts have been exhausted (714). Different amounts of shift to be tried are used in various embodiments. As one example, three shifts left and three shifts right can be used (i.e., allowing for only slight differences in timing between the two signals). As another example, twenty-four shifts left and twenty-four shifts right can be used (i.e., allowing for up to a day of shift in either direction between the signals). If no match is found after the shifts are exhausted, a determination can be made that the two domains do not share DNS query patterns (712).

Processes 400 and/or 700 can be performed periodically. As one example, process 700 can be performed (e.g., as a MapReduce job) daily in a Hadoop ecosystem executing on an elastic, scalable platform (such as platform 202), running on commodity server hardware (whether provided on premise, or as third party cloud infrastructure). In particular, every malicious domain included in malicious domain list 226 can have its DNS signature determined (e.g., in accordance with process 400), using the most recent ten days of passive DNS information (or another appropriate amount of data, such as seven days of passive DNS information). And, each of the target domains (i.e., those not filtered by prefilter 232 and not included in 226) can have pairwise comparisons performed (e.g., in accordance with process 700) against each of the known malicious domains. Processes 400 and 700 can be performed asynchronously, and in various embodiments are performed using a streaming architecture instead of/in addition to being performed as a daily (or other appropriate) batch job.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
receive a set of passive DNS query records that represent DNS queries made by a plurality of client devices, wherein the set of passive DNS query records comprises, for a first domain included in the DNS query records, a plurality of timestamps corresponding, respectively, to each time that a query for the first domain was made by a respective client device, wherein the client device is a first client device included among a plurality of client devices each of which has made at least one query for the first domain;
generate a first DNS query signature for a first domain, previously determined to be malicious, using at least a portion of the received set of DNS query records including by using a number of queries made, respectively, in each of a plurality of interval buckets of a given time series, wherein the first DNS query signature represents a pattern of DNS queries made by a first plurality of requesting clients for the first domain;
generate a second DNS query signature for a second domain using at least a portion of the received set of DNS query records, wherein the second DNS query signature represents a pattern of DNS queries made by a second plurality of requesting clients for the second domain;

compare the first DNS query signature and the second DNS query signature, and identify the second DNS query signature as malicious based on a detected match between the first DNS query signature and the second DNS query signature; and classify the second domain as a malicious domain; and a memory coupled to the processor and configured to provide the processor with instructions.

2. The system of claim 1 wherein generating the first DNS query signature for the first domain includes validating the first DNS query signature.

3. The system of claim 2 wherein validating the first DNS query signature for the first domain includes performing a fast Fourier transform.

4. The system of claim 1 wherein generating the second DNS query signature for the second domain includes filtering out DNS query records associated with one or more benign domains.

5. The system of claim 1 wherein generating the second DNS query signature for the second domain includes filtering out DNS query records associated with NX domains.

6. The system of claim 1 wherein comparing the first DNS query signature for the first domain and the second DNS query signature for the second domain includes determining a product-moment correlation coefficient using the respective first and second DNS query signatures.

7. The system of claim 1 wherein comparing the first DNS query signature for the first domain and the second DNS query signature for the second domain includes performing a shift on the second DNS query signature.

8. The system of claim 1 wherein the processor is further configured to associate malware family information pertinent to the first domain with the second domain.

9. The system of claim 1 wherein the processor is further configured to associate malicious behavioral information pertinent to the first domain with the second domain.

10. The system of claim 1 wherein the processor is further configured to provide an indicator of the second domain's maliciousness to a security appliance.

11. The system of claim 1 wherein the processor is further configured to provide the first DNS query signature to a security appliance.

12. A method, comprising:

receiving a set of passive DNS query records that represent DNS queries made by a plurality of client devices, wherein the set of passive DNS query records comprises, for a first domain included in the DNS query records, a plurality of timestamps corresponding, respectively, to each time that a query for the first domain was made by a respective client device, wherein the client device is a first client device included among a plurality of client devices each of which has made at least one query for the first domain;

generating a first DNS query signature for a first domain, previously determined to be malicious, using at least a portion of the received set of DNS query records, including by using a number of queries made, respectively, in each of a plurality of interval buckets of a given time series, wherein the first DNS query signature represents a pattern of DNS queries made by a first plurality of requesting clients for the first domain;

generating a second DNS query signature for a second domain using at least a portion of the received set of DNS query records, wherein the second DNS query signature represents a pattern of DNS queries made by a second plurality of requesting clients for the second domain;

comparing the first DNS query signature and the second DNS query signature, and identifying the second DNS query signature as malicious based on a detected match between the first DNS query signature and the second DNS query signature; and classifying the second domain as a malicious domain.

13. The method of claim 12 wherein generating the first DNS query signature for the first domain includes validating the first DNS query signature.

14. The method of claim 12 wherein generating the second DNS query signature for the second domain includes filtering out DNS query records associated with one or more benign domains.

15. The method of claim 12 wherein comparing the first DNS query signature for the first domain and the second DNS query signature for the second domain includes determining a product-moment correlation coefficient using the respective first and second DNS query signatures.

16. The method of claim 12 wherein comparing the first DNS query signature for the first domain and the second DNS query signature for the second domain includes performing a shift on the second DNS query signature.

17. A computer program product embodied in a non-transitory computer readable storage medium and comprising computer instructions for:

receiving a set of passive DNS query records that represent DNS queries made by a plurality of client devices, wherein the set of passive DNS query records comprises, for a first domain included in the DNS query records, a plurality of timestamps corresponding, respectively, to each time that a query for the first domain was made by a respective client device, wherein the client device is a first client device included among a plurality of client devices each of which has made at least one query for the first domain;

generating a first DNS query signature for a first domain, previously determined to be malicious, using at least a portion of the received set of DNS query records, including by using a number of queries made, respectively, in each of a plurality of interval buckets of a given time series, wherein the first DNS query signature represents a pattern of DNS queries made by a first plurality of requesting clients for the first domain;

generating a second DNS query signature for a second domain using at least a portion of the received set of DNS query records, wherein the second DNS query signature represents a pattern of DNS queries made by a second plurality of requesting clients for the second domain;

comparing the first DNS query signature and the second DNS query signature, and identifying the second DNS query signature as malicious based on a detected match between the first DNS query signature and the second DNS query signature; and classifying the second domain as a malicious domain.

18. The method of claim 13 wherein validating the first DNS query signature for the first domain includes performing a fast Fourier transform.

19. The method of claim 12 wherein generating the second DNS query signature for the second domain includes filtering out DNS query records associated with NX domains.

20. The method of claim 12 further comprising associating malware family information pertinent to the first domain with the second domain.

21. The method of claim 12 further comprising associating malicious behavioral information pertinent to the first domain with the second domain.

22. The method of claim 12 further comprising providing an indicator of the second domain's maliciousness to a security appliance.

23. The method of claim 12 further comprising providing the first DNS query signature to a security appliance.

* * * * *